(12) United States Patent
Dietrich et al.

(10) Patent No.: US 6,282,318 B1
(45) Date of Patent: Aug. 28, 2001

(54) METHOD AND SYSTEM FOR COMBINING PATTERN MATCHING AND OPTIMIZATION

(75) Inventors: Brenda Lynn Dietrich; Walter C. Dietrich, Jr., both of Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/070,322

(22) Filed: Apr. 30, 1998

(51) Int. Cl.[7] ........................................................ G06K 9/62
(52) U.S. Cl. .................................................................. 382/209
(58) Field of Search .................................... 382/199, 200, 382/203, 209, 210, 215, 217, 226; 375/341, 340, 262, 263, 264, 298, 346; 707/1, 3, 6

(56) References Cited

U.S. PATENT DOCUMENTS

| | | | | |
|---|---|---|---|---|
| 4,561,105 | * | 12/1985 | Crane et al. | 382/13 |
| 5,588,028 | * | 12/1996 | Parizhsky | 375/341 |
| 5,784,490 | * | 7/1998 | Akra et al. | 382/215 |
| 5,793,888 | * | 8/1998 | Delanoy | 382/219 |
| 5,915,250 | * | 6/1999 | Jain et al. | 707/100 |

* cited by examiner

Primary Examiner—Andrew W. Johns
Assistant Examiner—Seyed Azarian
(74) Attorney, Agent, or Firm—Stephen C. Kaufman, Esq.; McGinn & Gibb, PLLC (57) ABSTRACT

A method for combining pattern matching and optimization. The method includes the steps of reading the data elements and corresponding attributes for each of the two data files; performing pattern matching on the elements and the corresponding attributes of each of the two files read in this step; performing optimization on the results for finding a best total matching of the elements of the two files; and, outputting a file selected from the group consisting of the matches produced by step 3, and a file containing the elements that are not matched.

20 Claims, 6 Drawing Sheets

Primary Variables and Examples of Formulas

| From Construction of the Invention -- Introduction | |
|---|---|
| D | One of the sets being matched |
| R | The other set being matched |
| d,d*,d1,d2,... | Elements of D |
| r,r*,r1,r2,... | Elements of R |
| $s(d,r) : D \times R \rightarrow S$ | Function that gives a value in S denoting the similarity between d and r |
| S | Range of function s |
| $f : S \rightarrow R$ | f maps the range of s to the real numbers |
| M(d) | Set of possible matches for d |
| M'(d) | Set of comparison matches for d $M(d) \subseteq M'(d)$ |
| M*(d) | Small set of candidate matches for d produced when no further pairs can be matched. |
| minsim | Threshold value giving minimum acceptable value of f(d,r) for M |
| n | In one formulation of M, this integer gives the maximum number of matches allowed for each element of D |

FIG.4B

Primary Variables and Examples of Formulas

| From Construction of the Invention -- Introduction | |
|---|---|
| $m^*(d) = \text{argmax}\{f(d,r) : r \in M(d)\}$ | Best available match for d |
| $\text{diff}(d)$ | "Difference" between $f(d, m^*(d))$ and $f(d,r)$ for all other r in M(d) |
| $f(d, m^*(d)) - \max\{f(d,r) : r \in M'(d) - \{m^*(d)\}\}$ | Alternative formula for diff(d) |
| $\dfrac{(f(d, m^*(d))) - \max\{f(d,r) : r \in M'(d) - \{m^*(d)\}\}}{\text{standard deviation}\{f(d,r) : r \in M'(d)\}}$ | Alternative formula for diff(d) |
| $\dfrac{(f(d, m^*(d))) - \text{average } f(d,r) : r \in M'(d))}{\text{standard deviation}\{f(d,r) : r \in M'(d)\}}$ | Alternative formula for diff(d) |
| From Construction of the Invention -- Construction of the Matching | |
| $d^*$ | Element of D selected for matching |
| $r^*$ | Element of R selected for matching |

METHOD AND SYSTEM FOR COMBINING PATTERN MATCHING AND OPTIMIZATION

BACKGROUND OF THE INVENTION

This invention relates to a method and computer system for combining pattern matching and optimization, for example, providing an efficient match between the elements of two data files.

FIELD OF THE INVENTION

Our work relates to methodology and systems for combining disparate techniques, namely, pattern matching and optimization. This work is of interest in solving problems that can arise in the following three illustrative areas.

First, as companies merge and form partnerships that include the sharing of electronic data, it often becomes necessary to reconcile two or more databases that may contain data related to the same set of items. The individual databases may represent this data in different ways, for example, using different part numbers to identify the same item. Since these databases are typically very large, manually examining every record to determine the correct mapping is impractical. The consequences of an incorrect mapping can be severe, resulting in, for example, incorrect manufacturing processes or incorrect customer orders.

In addition to the manufacturing example cited above, there are numerous other instances in which it is desirable to compare two sets of elements and determine when an element in one set is the same as an element in another set. Consider the problem of merging two mailing lists, in which there may be slight differences in the spelling or punctuation of names and addresses. To reduce mailing costs, duplicates should be merged into a single entry, but to ensure completeness of the mailing list, and the accuracy of any additional data associated with the persons on the mailing list (e.g., buying history) it is important to avoid merging records associated with different individuals.

A third example occurs when lists of people are merged. For example, two agencies might wish to merge client or customer lists in order to detect fraud or incomplete data. For example, a court system might want to compare its list of potential jury members with voter rolls or tax rolls. If the court system finds a voter or tax payer who is not in the list of potential jury members, it represents a person who might be added to the list of potential jury members.

SUMMARY OF THE INVENTION

We have now discovered novel methodology and system construct that can combine the disparate technologies of pattern matching and optimization, to an end of addressing and solving the foregoing illustrative problems arising in the contemplated situation of reconciling two or more databases.

In particular, we disclose a method and system for efficiently computing a full or partial matching, that is, a one-to-one mapping, between two sets of elements, preferably based on one or more attributes associated with each of the elements. Our method is especially applicable in cases where there is more than one candidate match for some of the elements; in this case, our method can produce a matching, or partial matching, that is unlikely to have incorrect matches.

In a first aspect, the present invention discloses a method for matching the elements of two data files utilizing a programmable digital computer for performing the steps of:

a) reading the data elements and corresponding attributes for each of the two data files;

b) performing pattern matching on the elements and the corresponding attributes of each of the two files read in step a;

c) performing optimization on the results of step b for finding a best total or partial matching of the elements of the two files; and d) outputting a file selected from the group consisting of the matches produced by step c, and a file containing the elements that are not matched.

In a second aspect, the present invention discloses a computer system suitable for matching the elements of two data files, comprising:

means for reading the data elements and corresponding attributes for each of the two data files;

means for performing pattern matching on the elements and the corresponding attributes of each of the two files read;

means for performing optimization on the results for finding a best total matching of the elements of the two files; and means for outputting a file selected from the group consisting of the matches produced, and a file containing the elements that are not matched.

In a third aspect, the present invention discloses a method for matching the elements of two data files utilizing a programmable digital computer for performing the steps of:

a) reading the data elements and corresponding attributes for each of the two data files;

b) using relevant attributes for computing a similarity measure between some elements in the first file and some elements in the second file;

c) constructing using the similarity measure a set of possible matches for at least one element in one data file, the set of possible matches comprising elements from the other data file;

d) selecting an element that has at least one potential match and choosing from among the potential matches a best possible match;

e) deleting the selected element in step d from its data file, and the matched element in step d from each set of possible matches;

f) repeating step d and step e until a stopping criterion is met; and g) outputting a file selected from the group consisting of the matches produced by steps d and e, and a file containing the elements that are not matched along with their remaining potential matches.

For this third aspect of the present invention, we note the following preferred embodiments.

The attributes in step b preferably are matched using a similarity measure selected from the group consisting of numerical distance, lexicographic distance, Euclean or non-Euclidean metric, and perceptual distance.

The elements in the first data file may be matched with elements in the second data file using a combination of similarity measures that apply to the elements' attributes.

Step c may comprise constructing a set of possible matches based on the similarity measure exceeding a predefined minimum value, or alternatively, having a predefined maximum number of elements comprising the elements with the largest similarity values.

With respect to step d, the method may comprise selecting the element that has the fewest possible matches. Also the method may comprise selecting the element that has the match with the highest similarity measure. Alternatively, step d may comprise selecting the element that has the greatest difference between the similarity measure of the match with the highest similarity measure and the similarity measure of the match with the second highest similarity measure.

With respect to the step f stepping criteria, one may alternatively:

f) stop when the only matches that are left have a similarity measure that is below a predefined minimum value;

f) stop when the only elements that are left have two or more matches and the difference between the similarity measure of the match with the highest similarity measure and the match with the second highest similarity measure is less than a predefined minimum value;

f) stop when alternate f1 applies to all elements that only have 1 possible match and alternate f2 applies to all other elements;

f) stop when a predetermined amount of time has elapsed;

f) stop in accordance with a predetermined amount of time measured by processor time;

f) stop in accordance with a predetermined amount of time measured by elapsed wall-clock time; or f) stop when a predefined percentage of elements in either the first set or the second set has been matched.

BRIEF DESCRIPTION OF THE DRAWINGS

The invention is illustrated by the accompanying drawings, in which.

DETAILED DESCRIPTION OF THE INVENTION

As summarized above, we disclose a method for computing a full or partial match between two sets of elements. We assume that the data representing the two sets of elements is available in some digitized form. We also assume that there is available some set of methods for examining the data associated with each element in each set, and determining the similarity of each element in one set with each element in the other set. This similarity measure can be a single number, a qualitative value such as "none", "high" or "low", or a collection of such numbers or values, with each member of the collection corresponding to some aspect or attribute of the data associated with the elements. In the manufacturing example given above, attributes of a part might include size, color, and speed.

We note that for any selected element of the first set, we expect that for the vast majority of elements in the second set the similarity measure will indicate that the elements are definitely not the same. We let D denote one of the sets and R denote the other set. We use d, d1, d2, d* etc., to denote elements of D and we use r, r1, r2, r* etc. to denote elements of R. We let s(d,r) denote the similarity between d and r determined by analyzing the data. In computing the matching, we will consider as possible matches for d in D only those elements r in R which are sufficiently similar to d. The similarity function is not necessarily real-valued, so we also construct a function $f$ which maps the range $S=\{s(d,r): d\epsilon D, r\epsilon R\}$ on to the real numbers. However, one skilled in the art can readily see that by defining a partial ordering and a distance metric on S all of the steps in the method described below can be modified to work directly with the function s without recourse to the expedience of the real valued function $f$. Note that if s itself is a single number, then an obvious choice for $f$ is the identity function. If s is a vector of real numbers, say $s(d, r)=(s_1, s_2, \ldots, s_n)$ then the function $f$ could, for example, select the minimum of the values $s_1, s_2, \ldots, s_n$ or could give some algebraic combination of the values such as the sum $s_1+s_2+\ldots+s_n$ or the products $s_1 s_2 \ldots s_n$. For notational convenience we write $f(d, r)$ for $f(s(d, r))$.

The set of possible matches for d, denoted M(d), can be computed in a variety of ways. For example we could set a threshold value minsim and consider only pairs d, r for which $f(d, r)>$minsim. Alternatively, rather than setting a threshold value, we could specify an integer n>0 and for each d in D select the n elements r of R having largest value of $f(d, r)$. Regardless of the method used for determining M(d), it is possible, and indeed likely, that an element r in R will appear in the set of possible matches of several elements of D.

When selecting a match for an element d in D we seek an element r in R for which there is a high level of certainty that the match (d, r) is correct. We look for pairs (d, r) such that d and r are very similar and for which r is clearly the best possible match for d. The first condition is satisfied by focusing on pairs (d, r) for which $f(d, r)$ is large, by limiting the set M(d) to include only elements having (relatively) large value of $f(d, r.)$ Also, when selecting the match for d we choose the available candidate $m^*(d)=\arg\max\{f(d, r): r\epsilon M(d)$. The second condition is satisfied by considering pairs for which the "difference" between $f(d, m^*(d))$ and $f(d, r)$ is large, for all other r in M(d). If M(d) contains only one element, then this element is very likely to be a correct match for d and the value diff(d) should be large. In our implementation, when M(d) contains only one element we set diff(d) to an arbitrary large value if $f(d, r)$ is sufficiently large for that element r, and to 0 otherwise.

If M(d) contains more than one element, then diff(d) should measure the relative amount by which the best available match for d is better than other potential matches for d. This difference can be computed in several ways, including $f(d, m^*(d))-\max\{f(d, r): r\epsilon M'(d)-m^*(d)\}$, $$\frac{(f(d, m*(d)) - \max\{f(d, r) : r \in M'(d) - m^*(d)\})}{\text{standard deviation }\{f(d, r) : r \in M'(d)\}}, \text{ and}$$

$$\frac{(f(d, m*(d)) - \text{average}\{f(d, r) : r \in M'(d)\}}{\text{standard deviation }\{f(d, r) : r \in M'(d)\}},$$

where M'(d) is some specified superset of M(d). If this difference is small, then there is at least one element of M'(d) that is nearly as similar to d as $m^*(d)$ is, so there is less certainty that the match (d, $m^*(d)$) is correct.

In some cases a combination (weighted combination, the minimum of two or three of these, etc.) of these formulas is appropriate because the first two formulas insure that $m^*(d)$ is significantly better than the next-best match, while the third one insures that $m^*(d)$ is significantly better than the average match. If the standard deviation formulations are being used, having a large number of elements in M'(d) is desirable in order to give the standard deviation statistical significance.

Construction of the Matching

The construction of the matching begins with all elements of D and R unmatched and the list of matches empty. We first examine each data set in detail to construct the similarity function s. As an expedience we then map the values of s to the real numbers using the real-valued function $f$. Then for each d in D, the set of possible matches M(d) is computed and a comparison set M'(d) containing M(d) is constructed. Califano et al (U.S. Pat. No. 5,577,249), for example, give methods for efficiently computing similarity measures and for determining candidate matches from one data set for items in another data set. Then the possible matches r in M(d) are analyzed to determine the difference function for d, diff(d) as well as m*(d). Then, if there exists an element d in D having diff(d) sufficiently large, an element d* in D is selected for matching. In our implementation we select the element d* in D having the largest value of diff$f$(d). In an alternative method, the element d* with the largest value of $f$(d) is selected from the subset of D having sufficiently large values of diff(d). The element d* is matched to its best available match r*=m*(d*). The pair (d*, r*) is added to the set of matches, d* is deleted from D, r* is deleted from R and the sets M(d), and M'(d) and the values diff(d) are updated as required. If diff is computed using averages or standard deviations, then it is advantageous to keep matched elements r in M'(d) even if they have been deleted from M(d). If D is empty, or if there is no element of D having diff(d) sufficiently large, the method terminates, reporting the list of matched pairs, as well as the list of unmatched elements of D and the corresponding possible matches in R. (The corresponding matches of d can be all of M(d) or the elements of M(d) having sufficiently large values of diff(d).) Otherwise another element of D is selected for matching and the method proceeds as above.

Note that once an element r in R has been matched with an element of D, it is removed from further consideration and cannot be matched with any other element of D. This means that the sets M(d) will decrease in size as the matching is constructed. At some point, an element d in D may have only one possible match, say M(d)={r}. As long as $f$(d, r) is sufficiently large, one can safely conclude that r is a correct match for d.

The value of n, minsim, and mindiff are specified by the user of the matching method. In general, a larger value of n or a smaller value of minsim result in larger sets of possible matches, which may increase the likelihood of finding a full matching, at the expense of additional computation time. The exact choice of the difference function may be somewhat data dependent. The salient feature of the difference function should be that it increases as the absolute (arithmetic) difference between the most similar possible match and the remaining possible matches increases. Increasing mindiff reduces the likelihood of incorrect matches, but can increase the number of unmatched elements. Experimentation with small data sets can be used to find appropriate values. Experiments with large sets of data in which the correct matches are known in advance is also very useful. Let B be defined as the set of matches (d*,r*) and N be defined as the elements of D which are not in B, along with their best matches, in other words N={(d,r): d$\epsilon$D-B, r=m*(d)}. Comparing the values of $f$ for members of B with the values of $f$ for members of N can show important differences. (This comparison can be done by graphing the two sets of values using different colors for each set, for example.) Comparing the values of diff (d) for members of B with the values of diff(d) for members of N can also lead to insights. Since there are alternative formulas for diff, these experiments should be tried for multiple alternatives as this can lead to insights about which alternative will give the best results for the sets D and R.

A Preferred Implementation of the Invention

Figure 1:
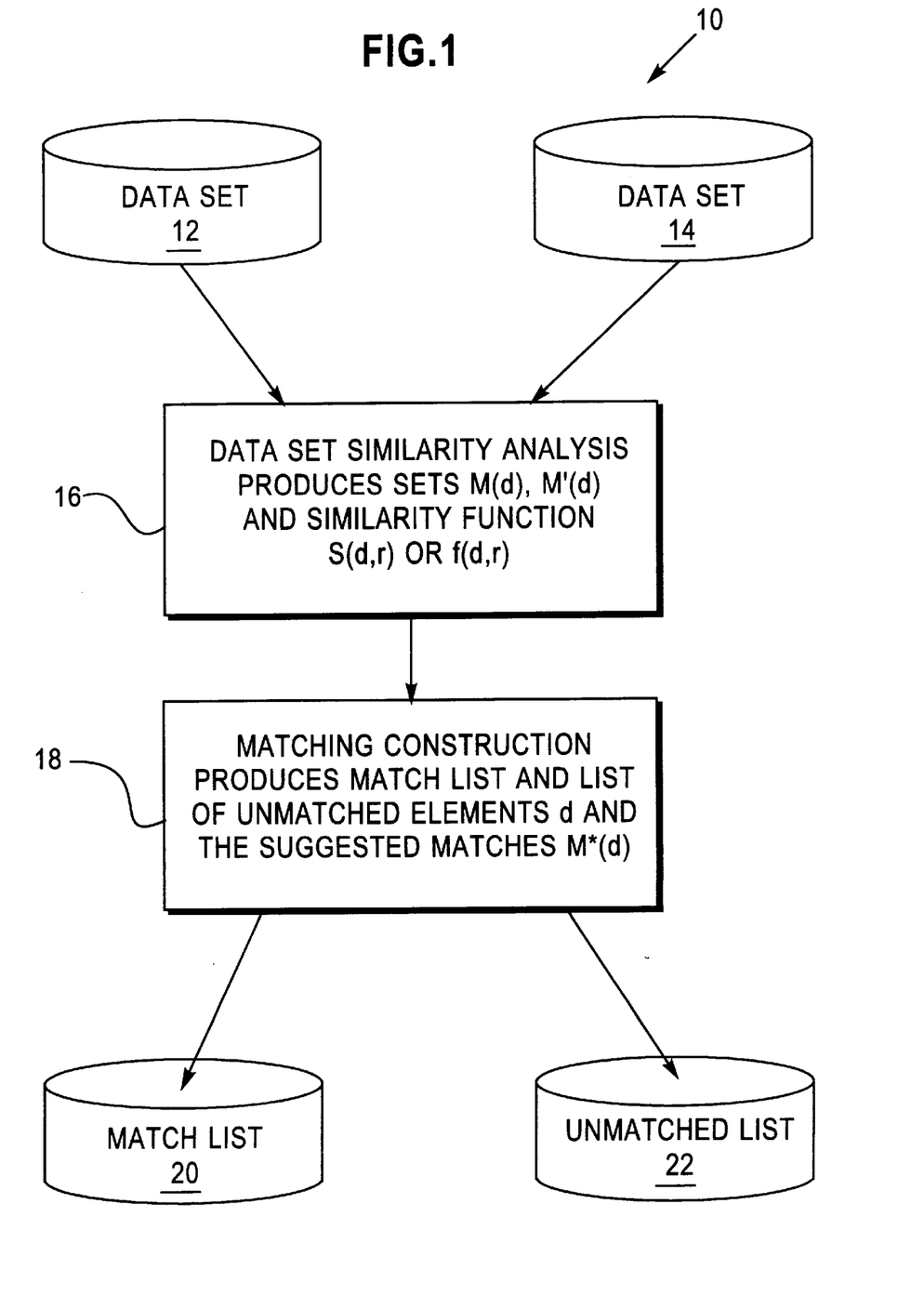
FIGS. 1—3 illustrate a preferred implementation of the invention.
Figure 2:
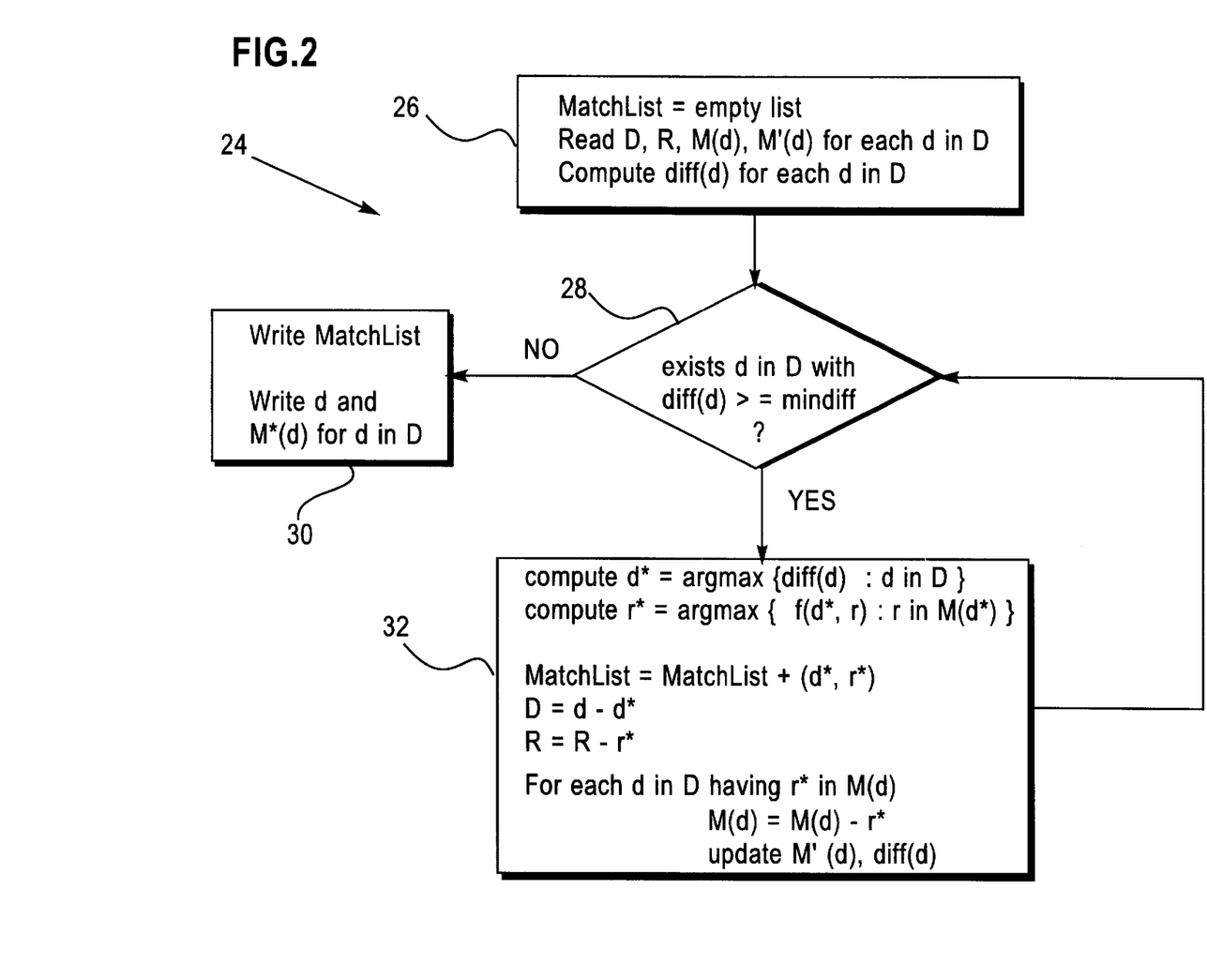
Figure 3:
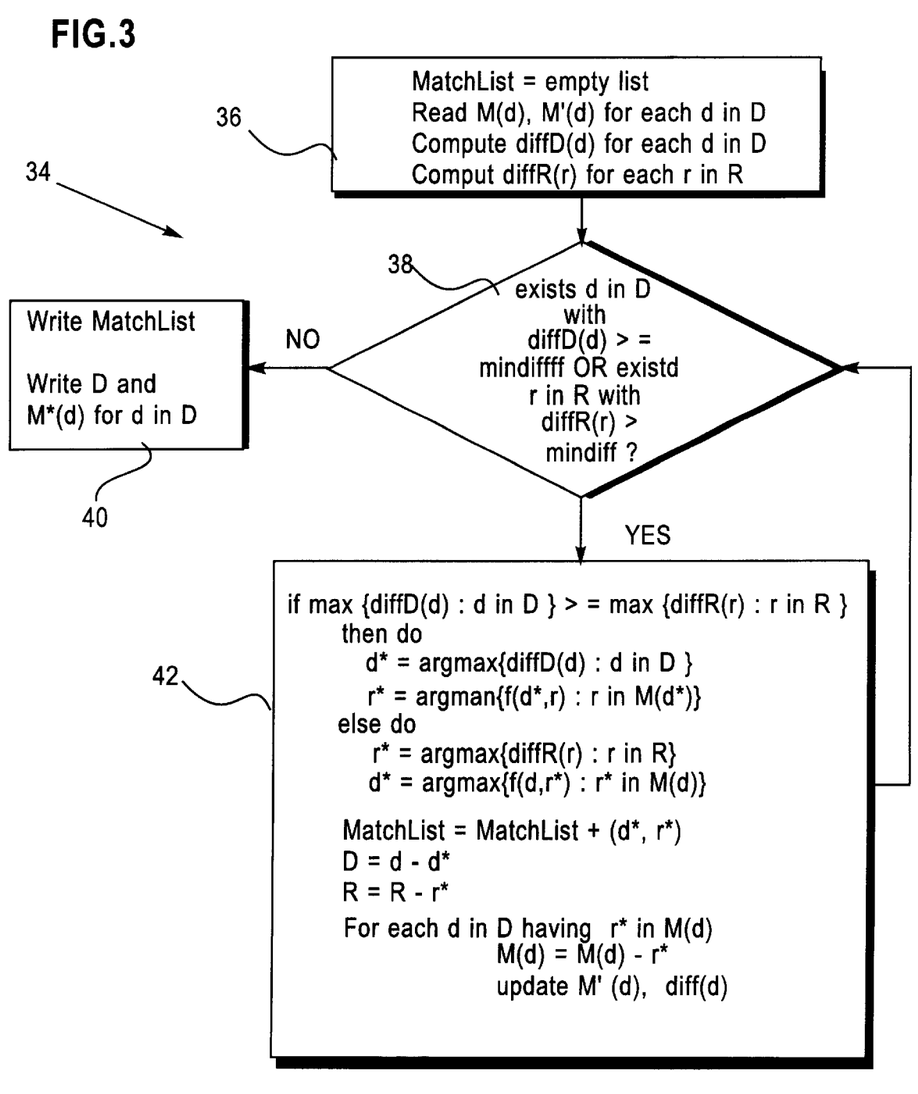
Figure 4A:
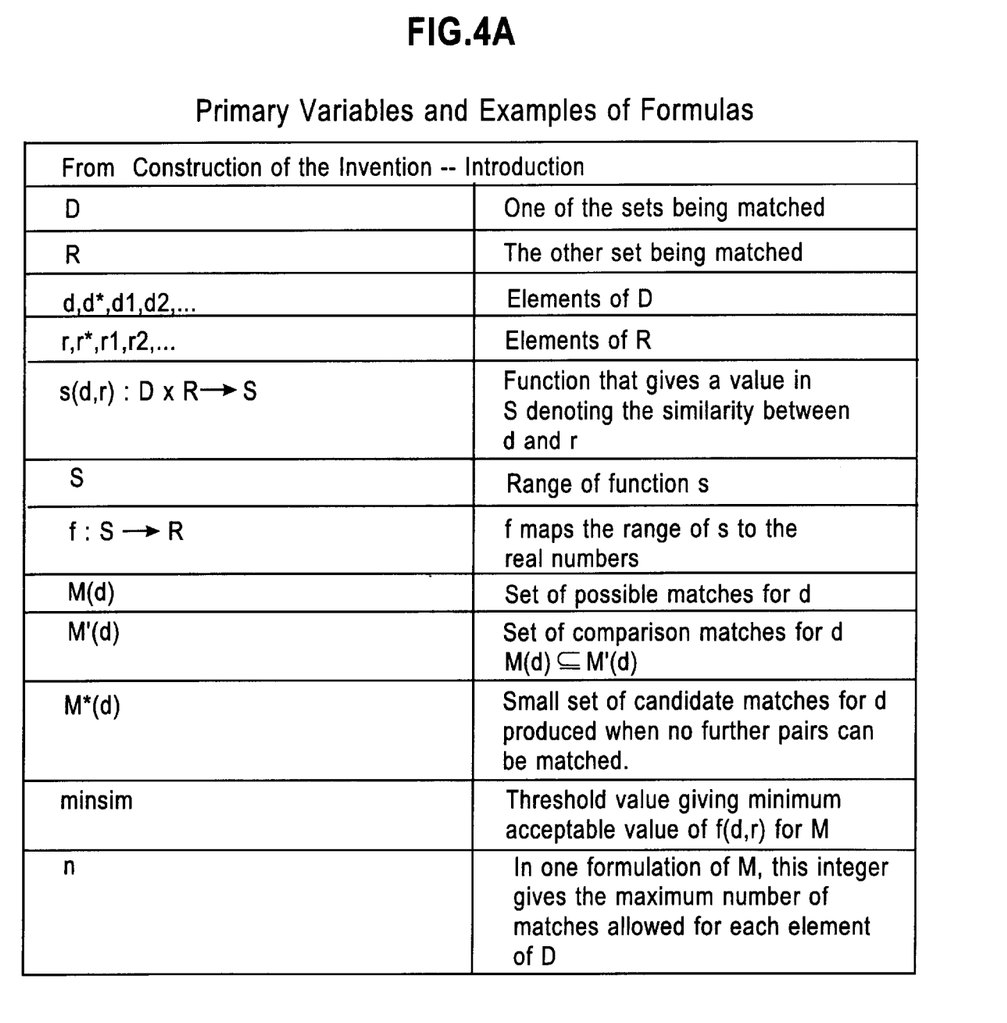
FIGS. 4A–4B comprise a Table of Primary Variables and Examples of Formulas.
Figure 4B:
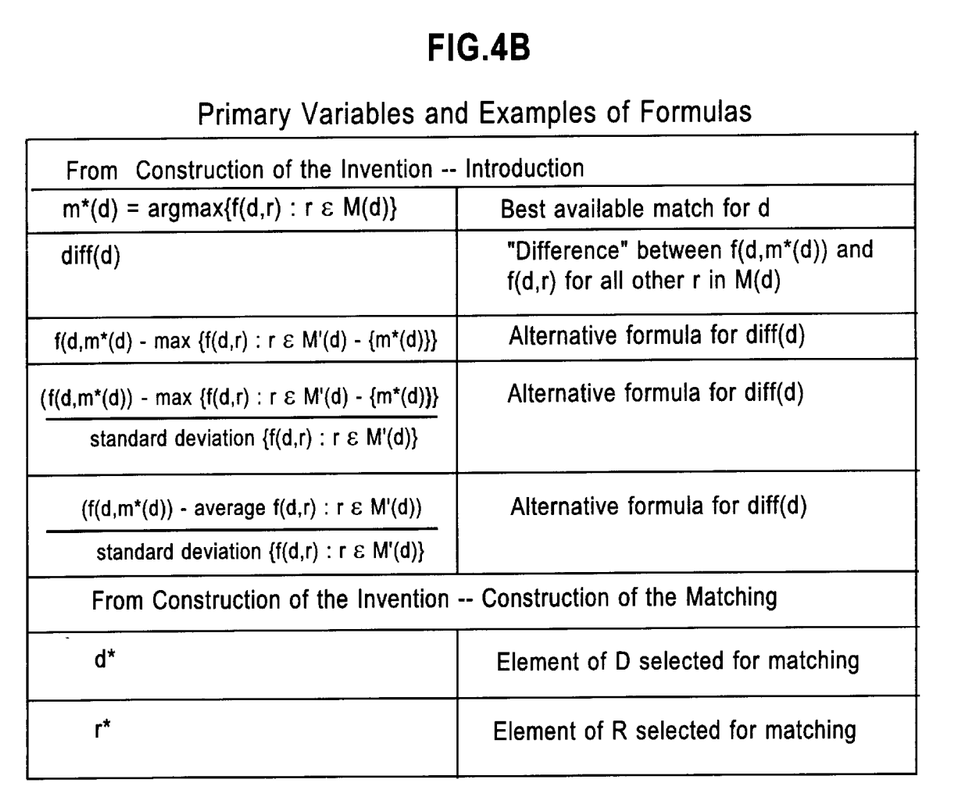

A preferred implementation of the invention is illustrated in FIGS. 1–4. FIG. 1, numerals 10–22, shows the flow of the data, including reading the data elements and the corresponding attribution, through the computation of the similarity measure and the construction of the sets of possible matches, to the construction of the full or partial matching, and termination with the creation of a file specifying the matching and, if required, of a file containing the unmatched elements and some of the possible matches for each unmatched element. FIG. 2, numerals 24–32, shows the iterative method used to construct the matching. FIG. 3, numerals 34–42, illustrates an alternative iterative method to the method shown in FIG. 2. The basic difference between the method shown in FIG. 3 and the method shown in FIG. 2 is that FIG. 3 illustrates a method in which the sets D and R are considered symmetrically.

FIG. 1 shows the overall design of a system that might use this method. This method performs the function shown in the lower rectangle and produces the outputs shown on the lower left and lower right. In the overall system, two different "data sets" are read in (from files, databases, or some other source.) These "data sets" are the sets D and R in the previous discussion. Some system compares the data in the two files and produces the functions s, and $f$, and the sets M(d) and M'(d) for each d in D. The sets D, R, M(d), and M'(d) and the functions s and $f$ are input to the matching construction. The matching construction produces two sets of output: the Match list giving pairs of elements from D and R, and the Unmatched list, giving elements of D which were not matched. For each unmatched d the construction also produces a subset M*(d) of the possible matches M(d) This subset M*(d) can be constructed with the $f$function, for example by selecting the best 2 or 3 matches according to the function $f$.

FIG. 2 depicts the steps required to construct a matching.

Block 26 shows the initializations steps of reading the sets D and R, setting the MatchList to be the emptylist, and computing the values diff(d) for each d in D (steps 1–3).

Block 28 shows the decision step of determining whether there is an element remaining in D to be mached or whether the algorithm should produce output and terminate (step 4). If there does not exists an element d$\epsilon$D with diff (d)>mindiff then the output is produced as depicted in block 30, otherwise another pair is selected and the problem is updated as depicted in block 32. Block 30 show the production of output. The MatchList is written to a file or database. The unmatched elements D, along with a list of candidate matches M*(d) for each are written to a files or database for further examination.

Block 32 (steps 5–9) shows the creation of the matching (d*, r*), the updating of the MatchList and the sets D and R, and the updating of the sets M'(d) and M(d) and of the function diff(d) for each d in D. The matching (d*, r*) is created by first selecting the element d* in D having the largest value of the diff function. Then the matching element of R is selected as the element of M(d*) that is most similar (according to the function f) to d*. The MatchList is updated by adding the newly matched pair (d*, r*). The elements d* and r* are deleted from the sets D and R, respectively. The element r* is no longer available to be matched, and is deleted from the sets M(d). The sets M'(d) may also be updated (this is optional and is dependent on the choice of the diff function). If M'(d) is updated, then the value diff(d)

typically must also be updated. In any case, diff(d) must be updated if r*=m*(d).

Detailed Steps in the Method Depicted in FIG. 2

Step 1. Initialize the match list: MatchList=EMPTYLIST.
Step 2. Read inputs D and R
Step 3. Compute the value diff(d) for each d in D.
Step 4. If there does not exists an element d∈D with diff(d)>mindiff then go to step 11;
Step 5. Select d*=arg max {diff(d): D∈D}
Step 6. Select r*=arg max {$f$(d*.r): r∈M(d*)}
Step 7. MatchList=Matchlist+(d*, r*)
Step 8. D=D-{d*}, R=R-{r*}, M(d)=M(d)-{r*} for all d∈D
Step 9: UpdateM'(d) and diff(d) for each d in D.
Step 10: Go to Step 4
Step 11: Write MatchList
Step 12: For each d∈D write d and a set of possible matchesM*(d)

FIG. 3 depicts an alternative, slightly more complex set of steps that can be used to construct a matching. The basic difference between the method shown in FIG. 2 is that FIG. 3 illustrates a method in which the sets D and R are considered symmetrically. For some instance, the method in FIG. 3 may produce larger partial matchings. However, the method in FIG. 3 is computationally more demanding. This method requires the used of two difference functions, one for the set D and one for the set R. These functions are denoted diffD and diffR respectively. The fomulae given above for diff can be used for diffD. Formulae for diffR can be obtained from the formula given above by simply reversing the roles of D and R.

Block 36 shows the initializations steps of reading the sets Dand, R, setting the MatchList to be the emptylist, and computing the values diffD(d) for each d in D and the values diffR(r) for each r in R (steps 1–3).

Block 38 shows the decision step of determining whether there is an element remaining in D or in R to be matched or whether the algorithm should produce output and terminate (step 4). If there does not exists an element d∈D with diffD(d)>mindiff or an element r∈R with diffR(r)>mindiff then the output is produced as depicted in block 40, otherwise another pair is selected and the problem is updated as depicted in block 34.

Block 33 show the production of output. The MatchList is written to a file or database. The unmatched elements D, along with a list of candidate matches M*(d) for each din D are written to a file or database for further examination.

Block 42 (steps 5–9) shows the creation of the matching (d*, r*), the updating of the MatchList and the sets D and R, and the updating of the sets M'(d) and M(d) and of the function diff(d) for each d in D. The matching (d*, r*) is created by first selecting an element d* in D or an element r* in R having the largest value of the diffD or diffR function, respectively. Then the matching element of R or D is selected according to the function $f$. The updating process is identical to that in FIG. 2, except that both difference functions must be updated.

Detailed Steps in the Method Depicted in FIG. 3

Step 1. Initialize the match list: MatchList=EMPTYLIST.
Step 2. Read inputs D and R
Step 3. Compute the value diffD(d) for each d in D and compute the value diffR(r) for each r in R
Step 4. If there does not exists an element d∈D with diffD(d)>mindiff or an element r∈R with diffR(r)>mindiff then go to step 11;
Step 5. If max {diffD(d): d∈D}>max {diffR(r): r∈R} then do
Select d*=arg max {diffD(d): d∈D}

Select r*=arg max {$f$(d*, r): r∈M(d*)}
Step 6. Else do
Select r*=arg max {diffR(r): r∈R}
Select d*=arg max {$f$(d,r*): r*∈M(d)}
Step 7. MatchList=Matchlist+(d*, r*)
Step 8. D=D-{d*}, R=R-{r*},M(d)=M(d)-{r*} for all d∈D
Step 9: UpdateM'(d) and diffD(d) for each d in D and update diffR(r) for each r in R
Step 10: Go to Step 4
Step 11: Write MatchList
Step 12: For each d∈D write d and a set of possible matchesM*(d)

Machine Realization of the Invention

Figure 5:
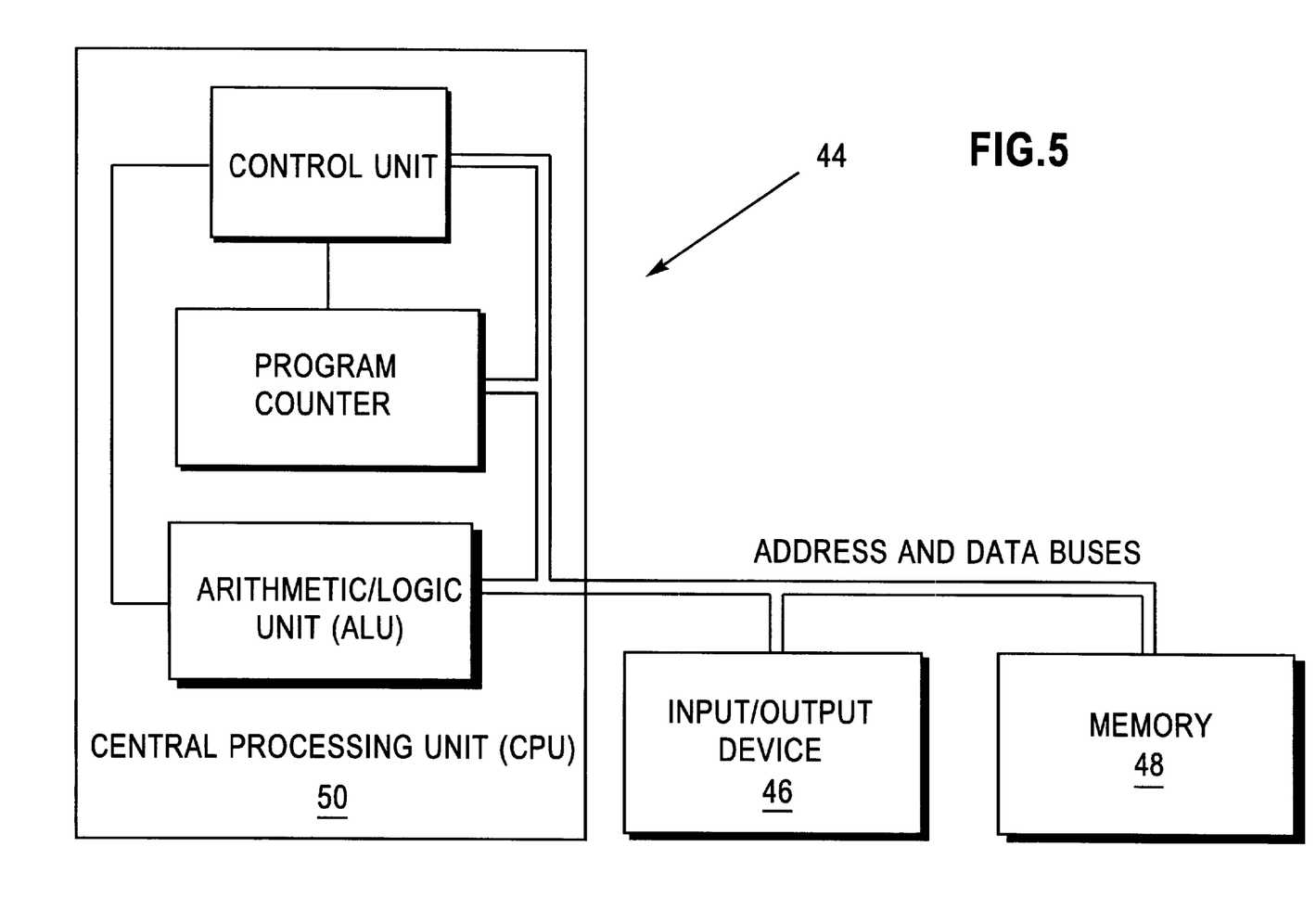
FIG. 5 shows a machine realization of the invention.

Attention is now directed to a computer system 44 shown in FIG. 5, which exemplifies one way in which the invention summarized above may be realized.

In particular, the computer system 44 includes an input/output device 46 and a memory 48 which can provide a means for reading data elements and corresponding attributes for each of two data files. A conventional CPU 50 connected to the I/O device 46 and memory 48, respectively, can act on relevant attributes for computing a similarity measure between some elements in the first file and some elements in the second file. The CPU 50 can construct, using the similarity measure, a set of possible matches for at least one element in one data file, the set of matches comprising elements from the other data file. The possible matches may be stored in memory 48 or the I/O device 46. Further, the CPU 50 can select an element that has at least one potential match, and choose from among the potential matches a best possible match. The products may, again, be stored in the I/O device 46 or memory 48. Finally, the CPU 50 can delete the selected element from its data file, and the matched element from each set of possible matches. The system may repeat the cycle until a stopping criterion is met, and then output to the I/O device 46 or memory 50, a file selected from the group consisting of the produced matches, or a file containing the elements that were not matched along with their remaining potential matches.

We claim:

1. A method for matching the elements of two data files, utilizing a programmable digital computer for performing the steps of:

a) reading data elements and corresponding attributes for each of the two data files;

b) using relevant attributes for computing a similarity measure between some elements in the first data file and some elements in the second data file;

c) constructing, using the similarity measure, a set of possible matches for more than one element in one data file, a set of possible matches comprising elements from the other data file;

d) selecting an element that has more than one potential match and choosing, from among the potential matches, a best possible match;

e) deleting, from the list of elements to be matched, the selected element in step d from its data file, and the matched element in step d from each set of possible matches;

f) repeating step d and step e until a stopping criterion is met; and g) outputting a file selected from the group consisting of the matches produced by steps d and e, and a file containing the elements that are not matched along with their remaining potential matches, wherein each element of one data file is matched to at most one element of the other data file.

2. A method according to claim 1, wherein attributes in step b are matched using similarity measures selected from the group consisting of numerical distance, lexicographic distance, non-Euclidean metric, perceptual distance, and a Euclidean metric.

3. A method according to claim 1, wherein elements in the first data file are matched with elements in the second data file using a combination of similarity measures that apply to the elements' attributes.

4. A method according to claim 1, wherein step c comprises constructing a set of possible matches based on the similarity measure exceeding a predefined minimum value.

5. A method according to claim 1, wherein step c comprises constructing a set of possible matches that has a predefined maximum number of elements.

6. A method according to claim 1, wherein step d comprises selecting the element that has the fewest possible matches.

7. A method according to claim 1, wherein step d comprises selecting the element that has the highest similarity measure.

8. A method according to claim 1, wherein step d comprises selecting the element that has the greatest difference between the similarity measure of the match with the highest similarity measure and the similarity measure of the match with the second highest similarity measure.

9. A method according to claim 1, wherein step f comprises stopping when the only matches that are left have a similarity measure that is below a predefined minimum value.

10. A method according to claim 1, wherein step f comprises stopping when a predetermined amount of time has elapsed.

11. A method according to claim 10, wherein the predetermined amount of time is measured by processor time.

12. A method according to claim 10, wherein the predetermined amount of time is measured by elapsed wall-clock time.

13. A method according to claim 1, wherein step f comprises stopping when a predefined percentage of the elements in either the first set or the second set has been matched.

14. A method for matching the elements of two data files utilizing a programmable digital computer for performing the steps of:

a) reading data elements and corresponding attributes for each of the two data files;

b) performing pattern matching on the elements and the corresponding attributes of each of the two data files read in step a;

c) performing optimization on the results of step b for finding a best total matching of the elements of the two data files; and d) outputting a file selected from the group consisting of the matches produced by step c, and a file containing the elements that are not matched, wherein each element of one data file is matched to at most one element of the other data file.

15. A computer system suitable for matching the elements of two data files, comprising:

means for reading data elements and corresponding attributes for each of the two data files;

means for performing pattern matching on the elements and the corresponding attributes of each of the two data files read;

means for performing optimization on the results for finding a best total matching of the elements of the two data files; and means for outputting a file selected from the group consisting of the matches produced, and a file containing the elements that are not matched, wherein each element of one data file is matched to at most one element of the other data file.

16. A computer system for providing a correct mapping of part numbers in data derived from a retailer's database of orderable items and a manufacturer's database of products which are purchasable by retailers, the computer system comprising:

means for reading data elements and corresponding attributes from each of the said two databases, the data elements and corresponding attributes comprising part numbers and associated information derived from said manufacturing and retailing databases;

means for performing pattern matching upon the attributes of each of the part numbers represented in the databases;

means for performing optimization on the results of the pattern matching so that there is a one-to-one matching between the part numbers in the retailer's database and the manufacturer's database; and means for outputting matched part numbers, wherein each element of one database is matched to at most one element of the other database.

17. The method according to claim 1, wherein one of said data files comprises a target database and the other of said data files comprises a source database, and wherein said each element in said target database being matched with at most one element of the source database results in a one-to-one mapping between said first and second data files.

18. The method according to claim 14, wherein one of said data files comprises a target database and the other of said data files comprises a source database, and wherein said each element in said target database being matched with at most one element of the source database results in a one-to-one mapping between said first and second data files.

19. The system according to claim 15, wherein one of said data files comprises a target database and the other of said data files comprises a source database, and wherein said each element in said target database being matched with at most one element of the source database results in a one-to-one mapping between said first and second data files.

20. The system according to claim 16, wherein one of said data bases comprises a target database and the other of said data bases comprises a source database, and wherein said each element in said target database being matched with at most one element of the source database results in a one-to-one mapping between said first and second data bases.

* * * * *